United States Patent
Croak et al.

(10) Patent No.: US 8,885,638 B2
(45) Date of Patent: *Nov. 11, 2014

(54) METHOD AND APPARATUS FOR ENABLING PEER-TO-PEER COMMUNICATION BETWEEN ENDPOINTS ON A PER CALL BASIS

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,152

(22) Filed: May 6, 2013

(65) Prior Publication Data

US 2013/0242981 A1 Sep. 19, 2013

Related U.S. Application Data

(63) Continuation of application No. 12/550,038, filed on Aug. 28, 2009, now Pat. No. 8,437,337, which is a continuation of application No. 11/108,937, filed on Apr. 19, 2005, now Pat. No. 7,583,660.

(51) Int. Cl.
H04L 12/66 (2006.01)
H04M 7/00 (2006.01)
H04L 29/06 (2006.01)

(52) U.S. Cl.
CPC ......... *H04L 65/1069* (2013.01); *H04M 7/0063* (2013.01); *H04L 65/104* (2013.01); *H04L 65/1006* (2013.01); *H04L 65/1043* (2013.01); *H04L 65/103* (2013.01); *H04L 29/06027* (2013.01)
USPC ........... 370/352; 370/338; 370/392; 370/401; 370/466

(58) Field of Classification Search
None
See application file for complete search history.

(56) References Cited

U.S. PATENT DOCUMENTS

| | | | |
|---|---|---|---|
| 6,778,491 B1 | 8/2004 | Fourcand et al. | |
| 6,876,646 B1 | 4/2005 | Dore et al. | |
| 7,583,660 B2 | 9/2009 | Croak et al. | |
| 2002/0176404 A1 | 11/2002 | Girard | |
| 2003/0231654 A1* | 12/2003 | Gilchrist et al. | 370/467 |
| 2004/0120502 A1 | 6/2004 | Strathmeyer et al. | |
| 2006/0013204 A1* | 1/2006 | Benedyk et al. | 370/352 |
| 2006/0067249 A1* | 3/2006 | Poustchi et al. | 370/260 |
| 2006/0142010 A1 | 6/2006 | Tom et al. | |
| 2008/0025295 A1 | 1/2008 | Elliott et al. | |
| 2008/0205277 A1* | 8/2008 | Ibezim et al. | 370/235 |
| 2012/0189001 A1* | 7/2012 | Ramachandran et al. | 370/352 |

\* cited by examiner

*Primary Examiner* — Duc C Ho

(57) ABSTRACT

A method and apparatus for enabling a user to signal to the network that a call to be initiated or a call that is in progress needs to occur in a peer-to-peer relationship with the terminating endpoint. The network will then remove itself from the call signaling and media path and direct the signaling and media communication to occur directly between the two endpoints.

20 Claims, 4 Drawing Sheets

METHOD AND APPARATUS FOR ENABLING PEER-TO-PEER COMMUNICATION BETWEEN ENDPOINTS ON A PER CALL BASIS

This application is a continuation of U.S. patent application Ser. No. 12/550,038, filed Aug. 28, 2009, which is currently allowed and is a continuation of U.S. patent application Ser. No. 11/108,937, filed Apr. 19, 2005, now U.S. Pat. No. 7,583,660, both of which are herein incorporated by reference in their entirety.

The present invention relates generally to communication networks and, more particularly, to a method and apparatus for enabling peer-to-peer communication between endpoints on a per call basis in packet networks, e.g. Voice over Internet Protocol (VoIP) networks.

BACKGROUND OF THE INVENTION

Network service providers offer many network features that provide enhanced services for both the signaling and the media path for calls between two endpoints. Redirection and transcoding services are examples of these enhanced network services. Occasionally, for a variety of reasons, users may want to avoid using the network to process signaling and media messages in order to keep their communication channels completely private and transparent to the network.

Therefore, a need exists for a method and apparatus for enabling peer-to-peer communication between network endpoints, e.g., VoIP network endpoints, on a per call basis in a packet network, e.g., a VoIP network.

SUMMARY OF THE INVENTION

In one embodiment, the present invention enables a user to signal to the network that a call to be initiated or a call that is in progress needs to occur in a peer-to-peer relationship with the terminating endpoint. The network will then remove itself from the call signaling and media path and direct the signaling and media communication to occur directly between the two endpoints.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
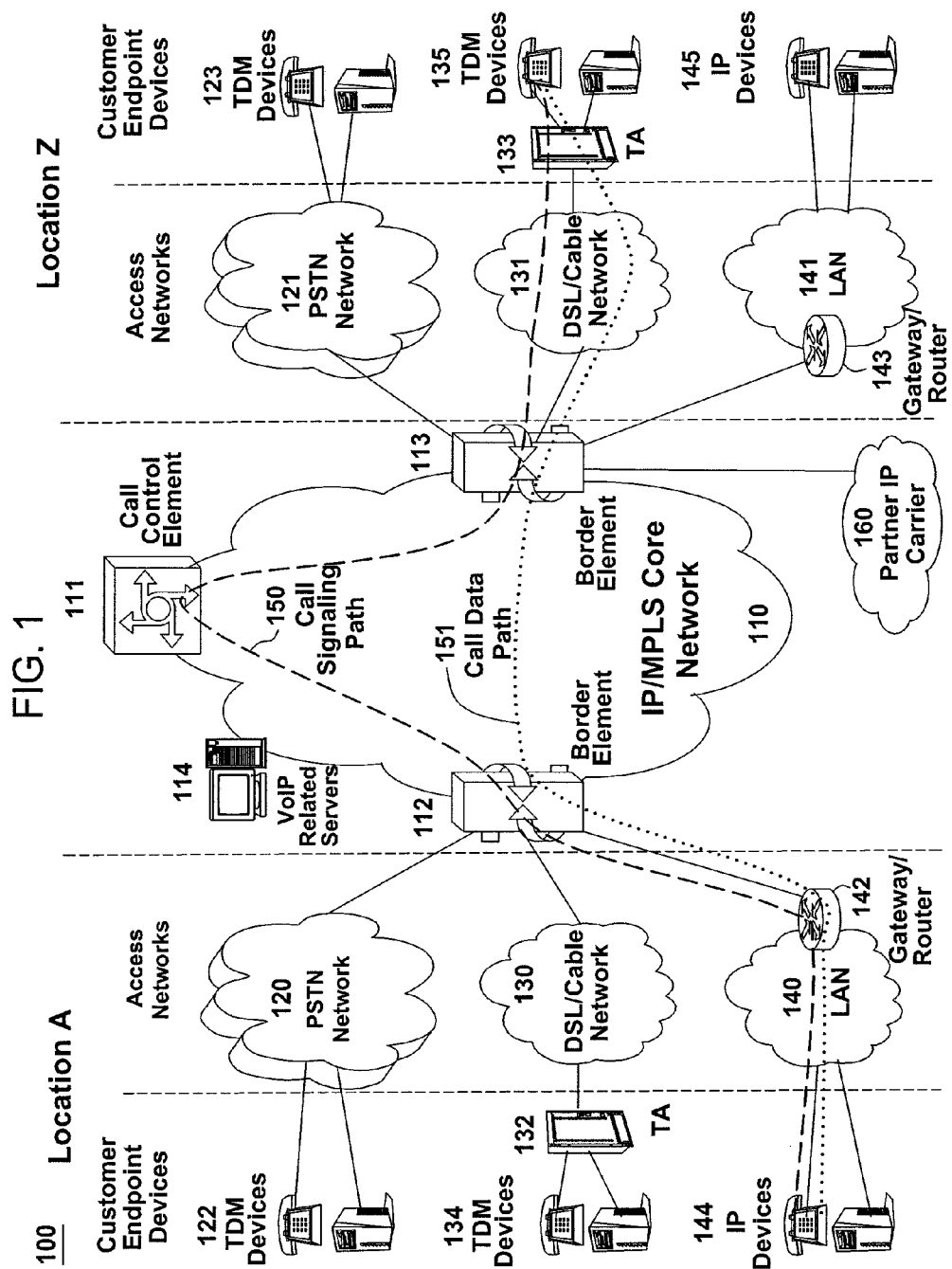
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Network service providers offer many network features that provide enhanced services for both the signaling and the media path for calls between two endpoints. Redirection and transcoding services are examples of these enhanced network services. Occasionally, for a variety of reasons, users may want to avoid using the network to process signaling and media messages in order to keep their communication channels completely private and transparent to the network.

To address this need, the present invention enables a user to signal to the packet network that a call to be initiated or a call that is in progress needs to occur in a peer-to-peer relationship with the terminating endpoint. The network will then remove itself from the call signaling and media path and direct the signaling and media communication to occur directly between the two endpoints.

Figure 2:
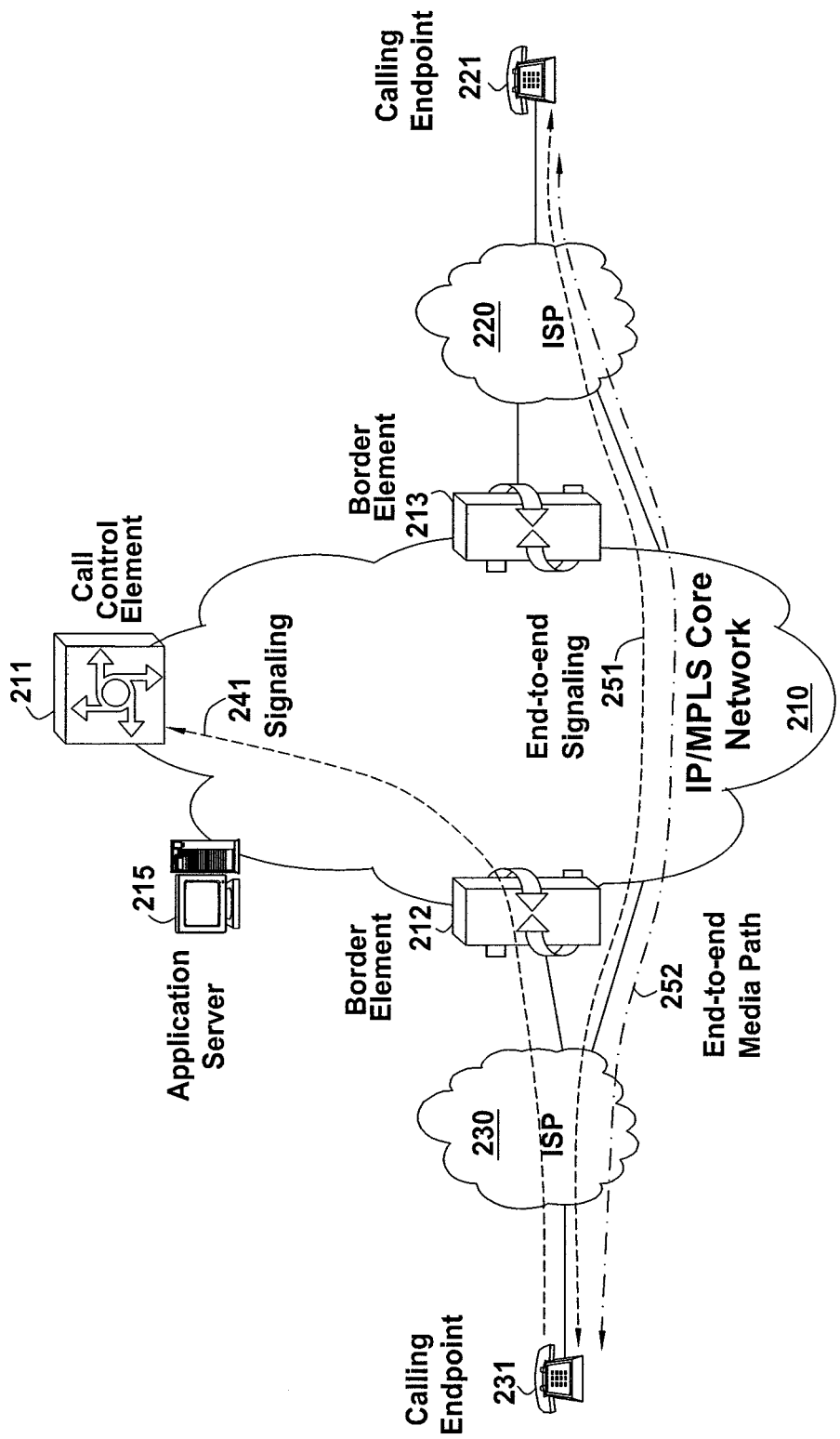
FIG. 2 illustrates an example of enabling peer-to-peer communication between VoIP endpoints on a per call basis in a VoIP network of the present invention.

FIG. 2 illustrates an example of enabling peer-to-peer communication between packet network endpoints, e.g., VoIP network endpoints, on a per call basis in a packet network, e.g., a VoIP network. In FIG. 2, calling endpoint 231 wants to make a private call to the called endpoint 221 using the peer-to-peer mode on a per call basis. Since the feature is on a per call basis, once the peer-to-peer call is finished, the endpoint that requests the feature will revert back to the normal mode of communications, i.e. placing calls using the VoIP network again. For example, once the peer-to-peer communication has ended, the calling endpoint can send a message to the BE 212 that the peer-to-peer communication has ended and that normal call processing via the VoIP network shall again be implemented. Note that endpoint 231 and endpoint 221 are both VoIP endpoints and both have direct access to the internet to perform peer-to-peer communications. Note also that endpoint 231 and endpoint 221 need not be supported by the same internet provider to perform peer-to-peer communications and the internet backbone network that connects the two Internet Service Providers (ISPs) need not be the same IP network supported by the VoIP network provider. For instance, endpoint 231 subscribes to internet services provided by Internet Service Provider (ISP) 230 and endpoint 221 subscribes to internet services provided by ISP 220. Calling endpoint 231 sends a predefined Dual Tone Multiple Frequency (DTMF) signal to the network 210, using flow 241, to enter into the peer-to-peer communication mode on a per call basis. Upon receiving the predefined DTMF signal, BE 212 and CCE 211 will ignore all call setup signaling messages from calling endpoint 231. In turn, endpoint 231 can signal via ISP 230 directly to endpoint 221, using end-to-end signaling flow 251, which subscribes to internet services via ISP 220. In other words, the call setup signaling messages are exchanged directly between endpoint 231 and endpoint 221 without the involvement of any VoIP network elements. Once the call setup procedures are completed between the two endpoints, the conversation will proceed using end-to-end media path 252 which is also established directly between endpoint 231 and endpoint 221 without the involvement of any VoIP network elements.

Figure 3:
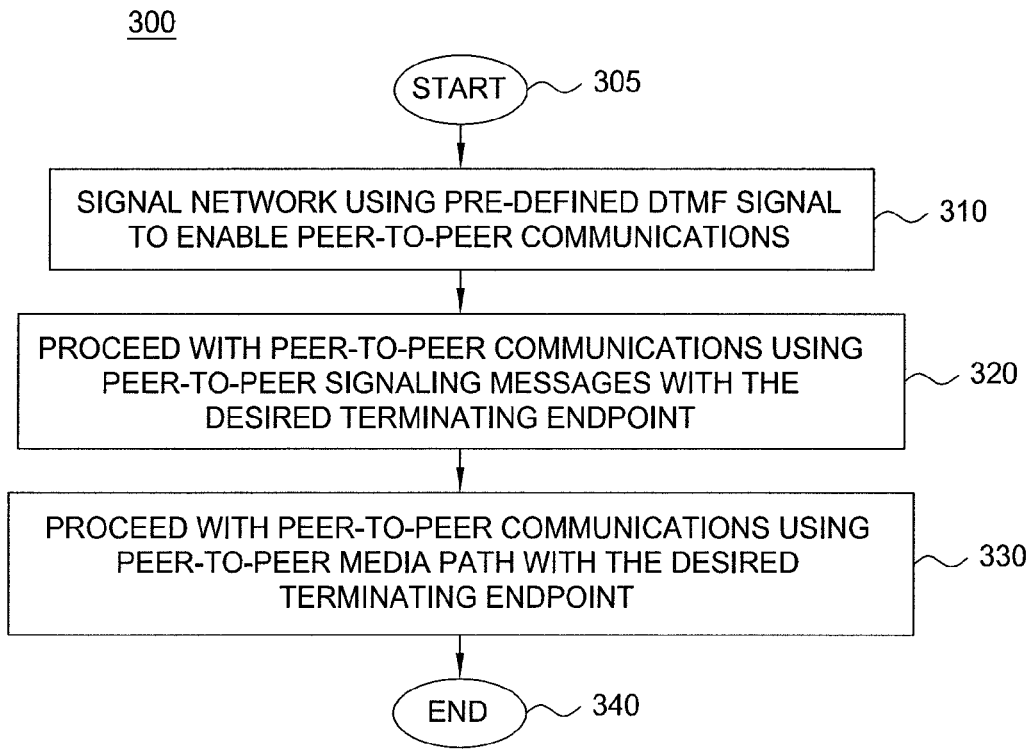
FIG. 3 illustrates a flowchart of a method for signaling the network to enable peer-to-peer communication in a VoIP network of the present invention.

FIG. 3 illustrates a flowchart of a method 300 for signaling the network to enable peer-to-peer communication in a packet network, e.g., a VoIP network. Method 300 starts in step 305 and proceeds to step 310.

In step 310, the method 300 signals the VoIP network using pre-defined signal, e.g., a predefined DTMF signal, to enable peer-to-peer communications. Once the DTMF signal has been received by the network, the network will remove itself from processing call setup message from the endpoint that originates the DTMF signal to request peer-to-peer communications. In step 320, the method proceeds with peer-to-peer communications using peer-to-peer signaling messages with the desired terminating endpoint. In step 330, the method proceeds with peer-to-peer communications using a peer-to-peer media path with the desired terminating endpoint. The method ends in step 340. Since the feature is on a per call basis, once the peer-to-peer call is finished, the endpoint that requests the feature will revert back to the normal mode of communications, i.e. placing calls using the VoIP network again.

Figure 4:
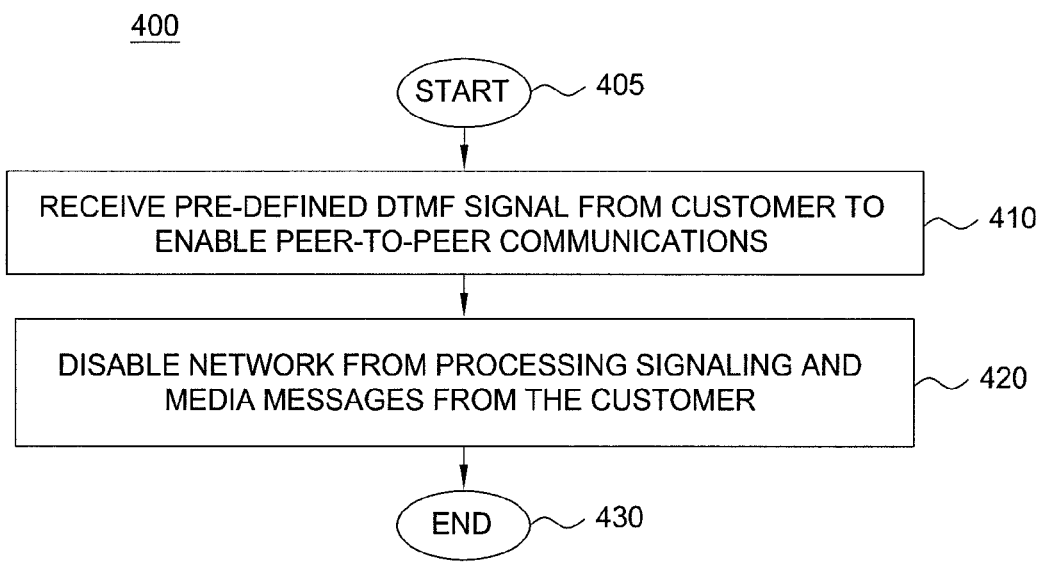
FIG. 4 illustrates a flowchart of a method for disabling the VoIP network from processing signaling and media communication in a VoIP network of the present invention.

FIG. 4 illustrates a flowchart of a method 400 for disabling the packet network, e.g., a VoIP network, from processing signaling and media communication in a VoIP network. Method 400 starts in step 405 and proceeds to step 410.

In step 410, the method 400 receives a pre-defined signal, e.g., a DTMF signal, from a calling endpoint to enable peer-to-peer communications on a per call basis. In step 420, the method disables the VoIP network and associated network elements from processing signaling and media messages from the endpoint requesting peer-to-peer communications.

The method ends in step 430. Since the feature is on a per call basis, once the peer-to-peer call is finished, the endpoint that requests the feature will revert back to the normal mode of communications, i.e. placing calls using the VoIP network again.

Figure 5:
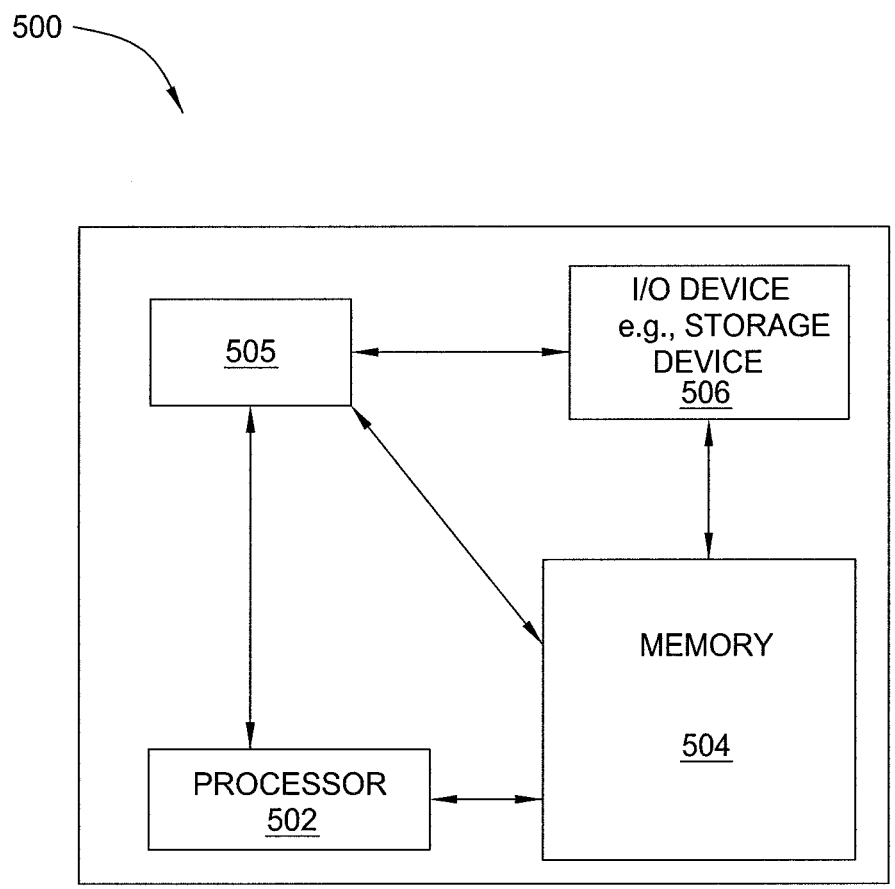
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a peer-to-peer communications between endpoints on a per call basis module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present peer-to-peer communications between endpoints on a per call basis module or process 505 can be loaded into memory 504 and executed by processor 502 to implement the functions as discussed above. As such, the present peer-to-peer communications between endpoints on a per call basis process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling peer-to-peer communication in a communication network, comprising:
   sending, by a processor of a calling endpoint device, a pre-defined signal to the communication network to enable a peer-to-peer communication mode on a per call basis, wherein the pre-defined signal is for requesting the communication network to stop processing a signaling message from the calling endpoint device; and
   proceeding, by the processor, with peer-to-peer communications using peer-to-peer signaling messages between the calling endpoint device and a called endpoint device.

2. The method of claim 1, wherein the communication network comprises an internet protocol network.

3. The method of claim 1, wherein the pre-defined signal is sent before a call is placed or during an ongoing call that is already in progress.

4. The method of claim 1, wherein the communication network resumes normal signaling message processing from the calling endpoint device after a peer-to-peer communication call is completed.

5. The method of claim 4, wherein the stoppage of processing the signaling message is performed by a border element associated with the calling endpoint device to prevent the signaling message from entering the communication network.

6. The method of claim 1, wherein the calling endpoint device and the called endpoint device both have direct internet access for performing the peer-to-peer communication.

7. The method of claim 1, wherein the proceeding with peer-to-peer communications uses a peer-to-peer media path between the calling endpoint device and the called endpoint device.

8. A tangible computer-readable medium storing a plurality of instructions which, when executed by a processor of a calling endpoint device, cause the processor to perform operations for enabling peer-to-peer communication in a communication network, the operations comprising:
   sending a pre-defined signal to the communication network by the calling endpoint device to enable a peer-to-peer communication mode on a per call basis, wherein the pre-defined signal is for requesting the communication network to stop processing a signaling message from the calling endpoint device; and
   proceeding with peer-to-peer communications using peer-to-peer signaling messages between the calling endpoint device and a called endpoint device.

9. The tangible computer-readable medium of claim 8, wherein the communication network comprises an internet protocol network.

10. The tangible computer-readable medium of claim 8, wherein the pre-defined signal is sent before a call is placed or during an ongoing call that is already in progress.

11. The tangible computer-readable medium of claim 8, wherein the communication network resumes normal signaling message processing from the calling endpoint device after a peer-to-peer communication call is completed.

12. The tangible computer-readable medium of claim 11, wherein the stoppage of processing the signaling message is performed by a border element associated with the calling endpoint device to prevent the signaling message from entering the communication network.

13. The tangible computer-readable medium of claim 8, wherein the calling endpoint device and the called endpoint device both have direct internet access for performing the peer-to-peer communication.

14. The tangible computer-readable medium of claim 8, wherein the proceeding with peer-to-peer communications uses a peer-to-peer media path between the calling endpoint device and the called endpoint device.

15. An endpoint device, comprising:
   a processor; and
   a computer-readable medium storing a plurality of instructions which, when executed by the processor, cause the processor to perform operations, the operations comprising:
      sending a pre-defined signal to the communication network to enable a peer-to-peer communication mode on a per call basis, wherein the pre-defined signal is for requesting the communication network to stop processing a signaling message from the endpoint device; and
      proceeding with peer-to-peer communications using peer-to-peer signaling messages between the endpoint device and a called endpoint device.

16. The endpoint device of claim 15, wherein the communication network comprises an internet protocol network.

17. The endpoint device of claim 15, wherein the pre-defined signal is sent before a call is placed or during an ongoing call that is already in progress.

18. The endpoint device of claim 15, wherein the communication network resumes normal signaling message processing from the endpoint device after a peer-to-peer communication call is completed.

19. The endpoint device of claim 18, wherein the stoppage of processing the signaling message is performed by a border element associated with the endpoint device to prevent the signaling message from entering the communication network.

20. The endpoint device of claim 15, wherein the endpoint device and the called endpoint device both have direct internet access for performing the peer-to-peer communication.

* * * * *